United States Patent [19]

Moreau

[11] Patent Number: 5,590,196
[45] Date of Patent: Dec. 31, 1996

[54] SECURE PAYMENT METHOD USING FACSIMILE

[75] Inventor: Thierry Moreau, Montreal, Canada

[73] Assignee: Connotech Experts Conseils Inc., Montreal, Canada

[21] Appl. No.: 319,041

[22] Filed: Oct. 6, 1994

[51] Int. Cl.$^6$ ............................ H04L 9/00; H04L 9/32
[52] U.S. Cl. ............................................ 380/18; 380/25
[58] Field of Search ............................. 380/18, 25, 54, 380/30

[56] References Cited

U.S. PATENT DOCUMENTS

| | | |
|---|---|---|
| 4,926,325 | 5/1990 | Benton et al. |
| 4,960,981 | 10/1990 | Benton et al. |
| 5,007,084 | 4/1991 | Materna et al. ............ 380/18 |
| 5,122,950 | 6/1992 | Benton et al. |
| 5,220,501 | 6/1993 | Lawlor et al. |
| 5,265,008 | 11/1993 | Benton et al. |
| 5,321,751 | 6/1994 | Ray et al. ................. 380/18 |
| 5,337,362 | 8/1994 | Gormish et al. ........... 380/54 |
| 5,473,691 | 12/1995 | Menezes et al. ........... 380/25 |

OTHER PUBLICATIONS

Scott E. Knudson, Jack K. Walton II, and Florence M. Young, "Business-to-Business Payments and the Role of Financial Electronic Data Interchange", Federal Reserve Bulletin, Apr. 1994.

The Electronic Messaging Services Task Force of the American Bar Association, "The Commercial Use of Electronic Data Interchange—A Report and Model Trading Partner Agreement and Model Electronic Data Interchange Trading Partner Agreement and Commentary", The Business Lawyer, Jun. 1990, pp. 1647–1749.

Garry Booth, "Winds of Exchange", Banking Technology, Oct. 1993, vol. 10, No. 8.

Datapro Information Services Group, "Facsimile Security: Overview, in Datapro Reports on Information Security", McGraw–Hill, Delran, NJ 08075, Jul. 1992.

Foultz, Walt H., "In Pursuit of the Paperless Workplace", Security Management, vol. 34, No. 1, Jan. 1990, pp. 85–86.

Barney, Michael G., "Analysis and Selection of Communications Security Equipment", Proceedings of the 1993 IEEE Carnahan Conference on Security Technology, IEEE, Oct. 13–15 1993, pp. 208–214.

I–Fax, "What is Intelligent Fax Networking?, Why Consider I–Fax", Broadcasting, Reader Response Forms, and the infocheck Group Ltd., commercial literature, (source unknown).

(List continued on next page.)

Primary Examiner—Salvatore Cangialosi
Attorney, Agent, or Firm—Swabey Ogilvy Renault

[57] ABSTRACT

Electronic funds transfer processes are being put into place to replace the paper based check clearing process. Although ubiquitous in the business environment, facsimile transmission technology has not been used for electronic transfer of funds. Fraud prevention and uncertainties in the legal status of a facsimile transmission are among the impediments for electronic funds transfer with facsimile. The method for transferring funds from a payer to a payee comprises the steps of preparing a payment form including information for identifying an amount to be transferred, a bank of the payee and an account number of the payee, receiving and verifying a security code at an encryption unit to authorize a transmission including an encryption, preparing a facsimile transmission device to send an image of the payment form, connecting the facsimile device through the encryption unit over a communication line to a payment service provider, receiving at the payment service provider the transmission including an encryption, and sending a confirmation message to the facsimile device that the transmission has been correctly received, decrypting the encryption at the payment service provider, determining whether the encryption was authentically generated by the payer, extracting the identifying information from the facsimile transmission, and generating an electronic funds transfer request based on the identifying information provided that the encryption is determined to be authentic.

23 Claims, 1 Drawing Sheet

OTHER PUBLICATIONS

Houthooft, Mario and Cnudde, Hedwig, "How to Secure a Mixed Mode Terminal Teletex X.25 Network", Proceedings of the 1989 IEEE International Carnahan Conference on Security Technology, IEEE, Oct. 3–5, 1989, pp. 315–316.

Lance J. Hoffman, Faraz A. Ali, Steven L. Heckler, Ann Huybrechts, "Cryptography Policy", Communications of the ACM, Sep. 1994, vol. 37 No. 9, pp. 109–117.

CCITT Recommendation X.5 (1992), "Facsimile Packet Assembly/Disassembly Facility (FPAD) in a Public Data Network".

CCITT Recommendation X.38 (1992), "G3 Facsimile Equipment/DCE Interface for G3 Facsimile Equipment Accessing the Facsimile Packet Assembly/Disassembly Facility (FPAD) in a Public Data Network Situated in the Same Country".

CCITT Recommendation X.39 (1992), "Procedures for the Exchange of Control Information and User Data between a Facsimile Packet Assembly/Disassembly (FPAD) Facility and a Packet Mode DTE or Another FPAD".

ISO/IEC 11577:1994, "Information Technology—Open Systems Interconnection—Network Layer Security Protocol".

Brassard, Gilles, "Modern Cryptology, a Tutorial", Lecture Notes in Computer Science, No. 325, Springer–Verlag, 1988.

Northern Telecom, "Entrust, Encryption and Digital Signature Explained", Northern Telecom Canada Limited, 1994.

Furash & Company, "Banking Role in Tomorrow's Payments System—vol. II—Payments System Overview", The Banker's Roundtable, Jun. 1994.

American Bankers Association, "Banking Literature Index", monthly with semi–annual and annual cumulation.

UMI/Data Courrier, ABI Inform Global Edition a bibliographical on CD–ROM, covering Jan. 1992 to Sep. 1994, UMI/Data Courrier, Louisville, KY 40202.

Bill St–Arnaud, "Recent Headlines from the FAX World Press", Vision 2000, Ottawa, Canada Apr. 1993, distributed as a broadcast fax newsletter on Apr. 19, 1993.

Benjamin Geva, "The Law of Electronic Funds Transfers", Matthew Bender, 1992, (updated to release 2, Oct. 1994).

"Payment by Facsimile (Fax) Transmission", Connotech Experts–Conseils Inc., short information document, Nov. 1994.

SECURE PAYMENT METHOD USING FACSIMILE

FIELD OF THE INVENTION

The present invention relates to a method for transferring economic value from a payor to a payee using a fascimile transmission.

BACKGROUND OF THE INVENTION

The traditional payment method for businesses is the transmittal of a paper document authorizing payment from a payer to a payee, known as a check. With this payment method, the payment transaction starts with a paper document sent from the payer to the payee. The paper check remains in the hands of the payee for a short time before it is deposited to the payee's bank (assuming the payee is an efficient business entity). The check then physically passes through the clearing process until it reaches the payer's bank. If the payer has sufficient funds, the payment transaction ends there (the check may be returned to the payer). Otherwise, the refused check follows the reverse route to the payee's bank and then to the payee (with a non sufficient funds notice).

This process is intrinsically inefficient since it involves physical movement of a piece of paper (see the book by Furash & Company, Banking Role In Tomorrow's Payments System—Volume II—Payments System Overview, The Banker's Roundtable, June 1994). By comparison, the information contents of a check could move almost instantaneously on a data communications network. The delays associated with the check payment system induce financial risk or uncertainty about the finality of the payment. Despite these weaknesses, paper checks are still the predominant payment method next to cash, with 59.4 billion checks processed by the US check clearing system in 1993 (see the article by Scott E. Knudson, Jack K. Walton II, and Florence M. Young, Business-to-Business Payments and the Role of Financial Electronic Data Interchange, Federal Reserve Bulletin, April 1994).

The banking industry is constantly looking for technological improvements to make the check processing more efficient, or to replace check payment with other payment methods.

An interesting improvement to the check processing system is the check image capture and truncation (see the book by Furash & Company, Banking Role In Tomorrow's Payments System—Volume II—Payments System Overview, The Banker's Roundtable, June 1994, page 13). With this technique, a digitized image of the check is taken at one point in the check process and the digitized image then replaces the check for further processing. Once scanned, the check itself is archived. The earlier the scanning operation occurs, the greater are the benefits of check truncation. In a sense, the present invention extends the idea of check truncation up to the payer's office: the required scanner is included in the payer's fax machine.

Alternatives to traditional check payment include bill payment at automated teller machines (idem, page 110), debit transactions at point-of-sale terminals (idem, page 111), customer activated terminals (idem, page 112), and banking by phone, personal computer, or interactive TV (idem, page 113). Such payment methods where the payment settlement is done substantially in real time with the transaction entry are covered by U.S. Pat. No. 5,220,501.

See the interview with H. Robert Heller by Robert A. Bennet, VISA's Big Worry: Becoming a Monopoly, United States Baker, February 1992, at page 26, about the distinction between off-line and real-time payment settlement.

Financial Electronic Data Interchange (EDI) is a marginal payment method in terms of transaction volume, but it is significant in terms of payment system user needs (see the article by Scott E. Knudson, Jack K. Walton II, and Florence M. Young, Business-to-Business Payments and the Role of Financial Electronic Data Interchange, Federal Reserve Bulletin, April 1994). With financial EDI, the payer prepares a payment transaction using his payables accounting software and electronically transmits the transaction including the payment information and the remittance data (typically the list of invoices paid). The payee receives electronic notification of the transaction in his receivables accounting package and its treasury standing is updated automatically. The U.S. payment system currently does not handle useful remittance data along with the payment transactions as in the case of financial EDI, irrespective of the payment method used (see the book by Furash & Company, Banking Role In Tomorrow's Payments System—Volume I—Ensuring a Role for Banks, The Banker's Roundtable, June 1994, p 22). For this reason, the financial EDI payment requires an EDI service provider for the non-financial part of the transaction. The present invention aims at providing equivalent convenience to the payee as financial EDI does.

To prevent fraud, the alternative payment methods require some form of communications security. The level of security provided by conventional facsimile machines (see the article by S. L. Berry, Faxpionnage: A New Threat Hits Mahogany Row, Management Review, July 1990 and the article by Michael Beacon, Assessing Public Network Security, Telecommunications, North American Edition, Vol. 23, Number 12, December 1989) is insufficient to be used for banking by fax.

Many contributions in the prior art of modern cryptography are used or may be used to provide the required security for the banking industry. The theoretical work for secure communications systems is reviewed in the book by Gilles Brassard, Modern Cryptology, Lecture Notes in Computer Science no. 325, Springer-Verlag, 1988 and is reflected in U.S. Pat. Nos. 4,200,770, 4,405,829 and 4,995,082. This prior art consists of elements of solutions, cryptographic methods, and specialized apparatuses. The provision of an effective protection in a given application context requires careful design of operational rules and complete systems. Despite the significant capabilities of the prior art of modern cryptology, it is not applied on a large scale (see the article by Stephen Kent et al., Codes, Keys and Conflicts: Issues in U.S. Crypto Policy, Report of a Special Panel of the ACM U.S. Public Policy Committee (USACM), Association for Computing Machinery, June 1994, page 12).

Recent developments in the area of Open Systems Interconnection security (see the ISO/IEC 7498-2:1989 and ISO/IEC TR 13594:1994 standard specifications) are aimed at facilitating the use of secure communication in existing non-secure networks. Methods for obtaining effective proofs of message transmission and message delivery are described in ISO/IEC 10181-4. This prior art relates protections as known by the end-users to cryptographic techniques which are referred to in generic terms. This prior art is intentionally conceptual. It reflects commonly agreed views rather than specific solutions. An implementation based on this prior art requires further inventive process. This level of abstraction extends to security protocol as in ISO/IEC 11577:1994 where cryptographic algorithms are left unspecified.

A very influential trend in cryptography is the so-called public key cryptography (see the book by Th. Beth, M. Frisch, G. J. Simmons, Public-Key Cryptography: State of the Art and Future Directions, Lecture Notes in Compute Science no. 578, Springer-Verlag, 1991). The prior art of public key cryptography is based on key pairs containing a private key and a public key. The private key is never divulged because the public key is sufficient for to encrypt a message to the private key holder and for digital signature verification. A single entity should use a given private/public key pair. There are appropriate algorithms to select a private/public key pair from a huge set of possible values. When combined with truly random bit generators, they ensure uniqueness of a private/public key pair.

With the notion of digital signatures from the public key cryptography, it is possible to secure the integrity and origin of a message without encrypting it (see the article by Stephen Kent et al., Codes, Keys and Conflicts: Issues in U.S. Crypto Policy, Report of a Special Panel of the ACM U.S. Public Policy Committee (USACM), Association for Computing Machinery, June 1994, page 26). The prior art of ISO/IEC 11577 is an example of a security protocol where authentication service may be provided with or without confidentiality protection.

The prior art of public key cryptography suggests the use of hashing algorithms in the form of a Manipulation Detection Code (MDC) prior to the digital signature algorithm which is generally too compute-intensive to be practical for long messages.

The task of cryptographic key management is critical to any security system. In the case of public key cryptography, it is described in the publication by RSA Laboratories, Answers to Frequently Asked Questions About Today's Cryptography, revision 2.0, RSA Data Security, Inc., October 1993, section 3. Specific prior art in this area includes the appendix C of ISO/IEC 11577 and the CCITT Recommendation X.509. The known ISO and CCITT standards regarding communications security introduced the notion of "security labels" for small pieces of information carried within a security protocol outside the normal message to indicated the security level (such as classified, secret, or top secret) or other characteristics of the message contents.

The application of public key cryptographic techniques for facsimile transmission in the context of remote banking services has not been previously envisioned to establish a new payment method (see the article by Mark Arend, Are Visa and MasterCard on the right track?, ABA Banking journal, September 1993, and the book by Furash & Company, Banking Role In Tomorrow's Payments System—Volume I—Ensuring a Role for Banks, The Banker's Roundtable, June 1994). A possible cause for this is the apparent difficulty in applying public key cryptography to the analog facsimile protocol. Public key cryptography is well suited to data communications where protocol extensions are easier to implement. In contrast, CCITT Group 3 facsimile protocol has little in common with data communications protocol.

Group 3 protocol is defined in the well known CCITT recommendations T.4 and T.30. The conversion of Group 3 facsimile protocol to and from a data communications protocol is covered by CCITT recommendations X.5, X.38, and X.39. This data communications protocol is X.25 described in CCITT recommendation X.25, ISO/IEC 8208 and ISO/IEC 7776. This data communications protocol may be made secure using the ISO/IEC 11577:1994 standard. Although these standardized protocols were created to accommodate each other, their combination has not been described in the prior art as a means of achieving secure facsimile transmission. The protocol conversion of CCITT recommendations X.5, X.38, and X.39 allows full duplex communication with error correction where the CCITT recommendation T.4 and T.30 supports only half duplex communication. Full duplex communication with error correction is a much easier environment for implementing public key cryptography.

References to prior art taking the form of standardized protocol do not imply strict compliance to the standard documents. This prior art may instead be used as guidelines to design a protocol process applying public key cryptography to the analog facsimile protocol. For instance, if X.25 data communication must be carried over the public switched telephone network as in the case of conventional facsimile transmission, then ISO/IEC 10732:1993 may be of interest. The existence of this prior art shows at least one avenue for applying public key cryptography to the analog facsimile protocol.

Even if the feasibility of secure facsimile transmission is ascertained and if the potential benefits of public key cryptography are within reach, there is still much uncertainty about the compatibility of payment by fax with the prevailing business practice.

In modernized small and medium businesses, accounting is typically done with a personal computer accounting software package. Personal computers traditionally lack security features. In addition, effective computer security is management-intensive. See the publication by Blaine Haine, Security Features of Windows NT, Proceedings of the Sixth Canadian Computer Security Symposium, pp 71–91, Communications Security Establishment, Government of Canada, 1994. For these reasons small business financial controls and auditing are still based on traditional methods. Auditing is mainly based on paper records of transactions. Financial controls are often limited to signing checks by the principals of the business. There may be more than one authorized signatory of a business bank account. The secure access control required for replacing the paper check with banking by personal computer may be hard to implement in a way that fits the small and medium business requirements. In addition, compatibility problems with the many existing accounting software packages may impede the acceptance of banking by personal computer. This compatibility issue is already impeding the penetration of EDI.

In the business world, Group 3 facsimile machines are ubiquitous. It is a flexible communications means accommodating almost any type of visual information, thus less threatened by compatibility problems. Facsimile is increasingly used in mixed environments where one party has an actual facsimile machine and the other party uses a facsimile interface to a computer. Examples includes fax-on-demand service, electronic mail delivery by fax, and direct fax transmission from a personal computer. Means of controlling the access to a facsimile machine or to the facsimile transmission capability of a computer system are conceivable but not readily available (see the publication by International Verifact, Setting new Standards of Excellence in Point-of-Sale/Debit transactions through technology and vision, product line litterature of International Verifact Inc., Toronto, Ontario, Canada, distributed with the International Verifact Inc. 1994 Annual Report, 1994 and the book by Gilles Brassard, Modern Cryptology, Lecture Notes in Computer Science no. 325, Springer-Verlag, 1988 section 5.3).

In cases where an access control device is located on customer premises, a special type of access control threat has to be prevented: if one may access the private key of a private/public pair by opening the device and probing its circuits without this being noticed, digital signature forgery may occur. For this type of threat, anti-tamper protection may be required. This refers to physical protection of the electronic circuitry against undetected tampering (see the publication by International Verifact, Setting new Standards of Excellence in Point-of-Sale/Debit transactions through technology and vision, product line litterature of International Verifact Inc., Toronto, Ontario, Canada, distributed with the International Verifact Inc. 1994 Annual Report, 1994 and the application brief entitled Tamper Detector for Touch Memory, at page 81 of 50 Ways to Touch Memory, second edition, Dallas Semiconductor, Dallas, Tex., October 1992).

Any new payment method has to offer economic benefits. Out of the 59.4 billions checks processed in 1993, 40% were issued by businesses (see the article by Scott E. Knudson, Jack K. Walton II, and Florence M. Young, Business-to-Business Payments and the Role of Financial Electronic Data Interchange, Federal Reserve Bulletin, April 1994). In retail banking, processing a check costs $0.68 while an electronic counterpart would typically halve that cost (see the book by Furash & Company, Banking Role In Tomorrow's Payments System—Volume II—Payments System Overview, The Banker's Roundtable, June 1994, p 108). The overall cost of a payment by a business is reported to be $8.33 (idem, p 40), with savings if electronic payments are used.

To materialize economic benefits, a new payment method has to exploit the same productivity tools as the existing payment systems. These tools include optical character recognition and optical mark recognition currently in operation with the imaging systems used in check truncation.

A payment transaction ultimately involves the transfer of monetary value from the payer's bank to the payee's bank, with some related information. Electronic payments are supported by EFT networks that provide the actual payment ability, including the required settlement process between the two banks. Automated Clearing Houses (ACH) in the U.S. and the Direct Funds Transfer System (DFTS) in Canada are examples of EFT networks.

To ensure optimum availability of a service accessed through a telecommunications network, various network features are available such as automated call distribution, call redirection, and direct inward dialing.

SUMMARY OF THE INVENTION

The present invention relates to a payment process using secure facsimile transmission, e.g. Group 3 protocol. In this process, the payer sends a payment request by fax to a service provider acting as the interface between the payee and an electronic funds transfer network. This electronic funds transfer network is of the type already established in the banking industry for other forms of electronic funds transfer. The service provider may be the payer's bank itself, or an entity authorized by the payer to make debit transactions on the payer's account.

The service provider ascertains the authenticity of the received facsimile message using the cryptographic mechanisms described hereafter. This is done in real time with the transmission. It also records the message in the form that was used to perform this authentication, in order to preserve evidence of the payment request. These operations are made using the digitized form of a facsimile message. The service provider computer system which is of the type used as imaging systems in the banking industry except that the digitized images come from the payer facsimile machine rather than the service provider scanner. The service provider processes the payment request by interpreting the contents of the payment request and initiating a financial transaction in the EFT network. This processing is done after transmission is complete. This accommodates the cases where payment request processing is not fully automated (with techniques such as optical character recognition) and a human operator has to review the payment request on a computer display.

Being based on facsimile transmission (the presently preferred protocol being CCITT Group 3), the present invention is an intermediate alternative between a paper based process and an all electronic payment system. A printed copy of the payment request can always be produced by the service provider and the cryptographic authentication is applied to the digitized form of this printed copy, not to the details of the transaction as understood by reading the contents. A digital signature can hardly come closer to a real signature on a piece of paper. In all electronic payment processes, the cryptographic authentication is applied to the details of the transaction as understood by the receiving computer system (EDI transaction formats). This characteristic makes the present invention easier to use for any type of financial transaction. No pre-determined transaction format is involved.

The security of facsimile transmission for payment authorization is implemented with a cryptographic device located on the payer premises. This device has a form of electronic locking mechanism. The signatories of a bank account must present a magnetic card or a hand held memory device and must enter a secret personal identification number to unlock the device for a particular bank account. This unlocking allows the device to use the private key of a private/public cryptographic key pair for transactions on this bank account. The private key is then used by the device to affix a digital signature to the transmitted facsimile pages.

The service provider has a corresponding cryptographic device that verifies the digital signature of the payer.

The payment transaction initiated with the present invention may be confirmed by the service provider to the payer and to the payee, by the payer's bank to the payer, and by the payees bank to the payee. With the present invention, it may be cost justified for the service provider to use EDI notification of payments to the payee on behalf of the payer.

According to the invention, there is provided a method for transferring economic value, such as money, negotiables and securities, from a payer to a payee comprising the steps of:

a) preparing a value transfer form including information for identifying a specific value to be transferred, a financial institution able to receive the value on behalf of the payee and an account number of the payee;

b) receiving and verifying a security code at an encryption unit to authorize a transmission including a cryptographic processing result;

c) preparing a facsimile transmission device to send an image of the value transfer form;

d) connecting the facsimile device through the encryption unit over a communication channel to a value transfer service provider;

e) sending the image of the value transfer form in the transmission;

f) receiving at the value transfer service provider the transmission including the cryptographic processing result;

g) sending a confirmation message to the facsimile device that the transmission has been correctly received;

h) decrypting the cryptographic processing result at the value transfer service provider;

i) determining whether the cryptographic processing result was authentically generated by the payer;

j) extracting the identifying information from the facsimile transmission; and k) generating an electronic value transfer transaction based on the identifying information provided that the cryptographic processing result is determined to be authentic in step (i).

Preferably, the cryptographic processing result includes a digital signature. The digital signature is preferably generated according to a protocol which is of an acceptable security level to the payer, and the method may be preceeded by a preliminary contractual acceptance by the payer that said digital signature is always valid. Also, the method may further comprise a step of recording the transmission. And steps (b) and (d) may comprise taking the encryption unit from a secure storage position, receiving and verifying the security code at a position conveniently near where step (a) is carried out, and then connecting the encryption unit to the channel and the facsimile device.

According to the invention, there is also provided a method for transferring economic value, such as money, negotiables and securities, from a payer to a payee by a value tansfer service provider, the method comprising the steps of:

a) receiving at the value transfer service provider a transmission including a cryptographic digital signature from a facsimile device of the payer, said transmission including image data of a value transfer form including information identifying a specific value to be transferred, a financial institution able to receive said value on behalf of the payee and an account number of the payee;

b) sending a confirmation message to said facsimile device that said transmission has been correctly received;

c) decrypting the cryptographic processing result at the value transfer service provider;

d) determining whether the cryptographic processing result was authentically generated by the payer;

e) extracting said identifying information from the facsimile transmission; and f) generating an electronic value transfer transaction based on said identifying information provided that the cryptographic processing result is determined to be authentic in step (d).

BRIEF DESCRIPTION OF THE DRAWINGS

The invention will be better understood by way of the following detailed description of a preferred embodiment of the invention with reference to the appended drawing, in which.

DETAILED DESCRIPTION OF THE PREFERRED EMBODIMENT

Figure 1:
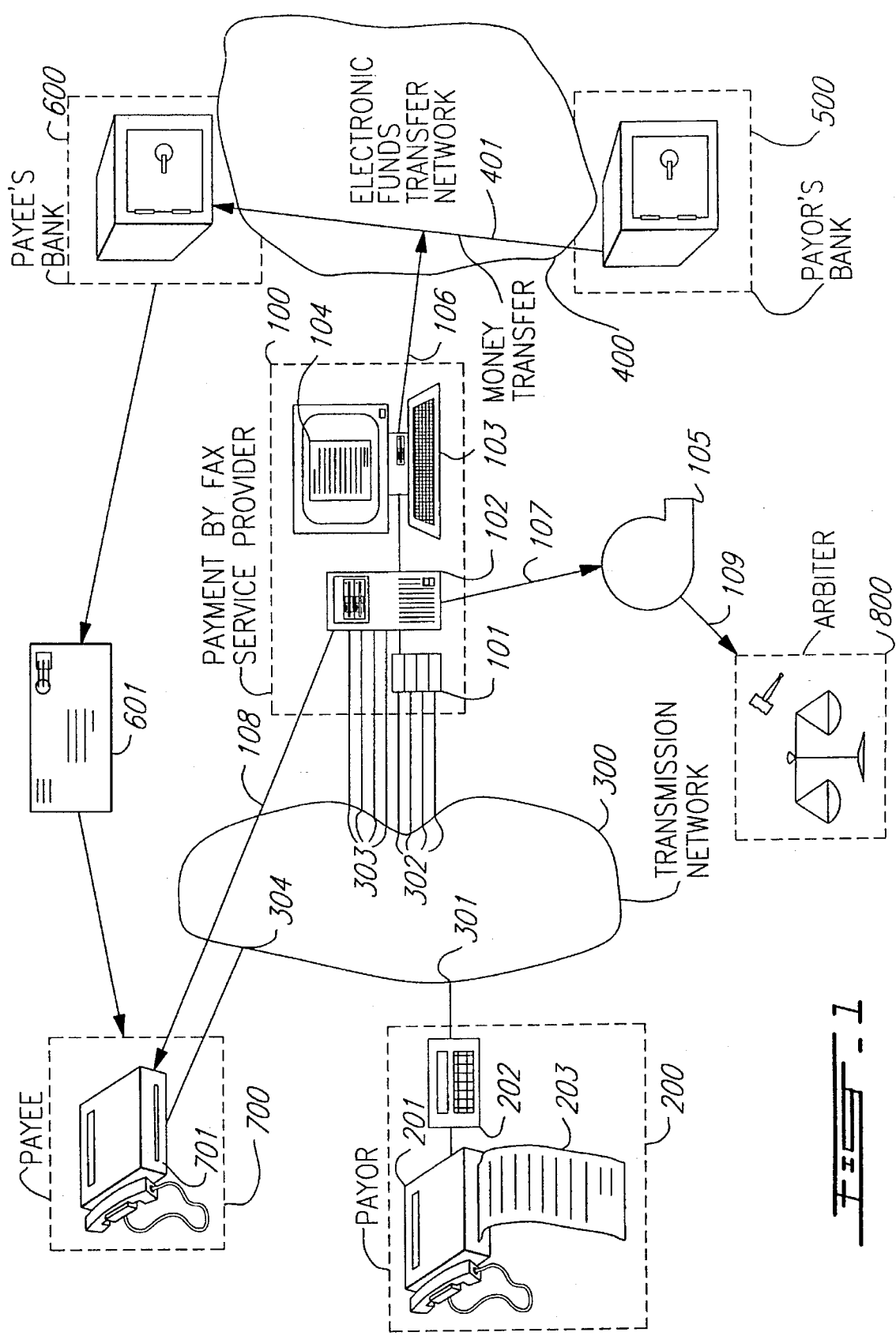
FIG. 1 is a block diagram illustrating the system for transferring funds from a payor to a payee using a fascimile transmission according to the preferred embodiment.

The sequence of events for a payment transaction using the present invention occurs as follows.

At the payer site, 200, a business payment form 203 is filled out with the payment data, including the payee identification, the payer and the payee bank and account number, and remittance information. The individuals entitled to authorize payments must follow a procedure to unlock the device for secure transmission of a number of pages. These same individuals may also be required to sign the business form 203 which is then faxed through group 3 facsimile machine 201 and encrypted by the encryption unit 202. The encryption unit 202 provides secure authentication of the facsimile message. The secure facsimile message is sent to the service provider 100 for payment by fax. At the service provider site, the facsimile message is decrypted by the encryption unit 101 and then fed into the transaction processing systems. At the operator terminal 103, the image of the business form 104 is converted into an electronic funds transfer (EFT) transaction 106 which is effected by the EFT network 400 as the money transfer 401 from the payer's bank 500 to the payee's bank 600. Automation may be applied to the task performed at operator terminal 103. This automation may take the form of optical character recognition or optical mark recognition.

With the recording operation 107, the image of the business form 104 along with the authentication data originating from the encryption unit 202 is recorded on digital mass storage medium 105 by the service provider. This record may be used as electronic evidence of the payment request by the payer 200 for the purposes of arbitration.

A payment notification 108 may be performed by the service provider 100 to notify the payee 700 of the payment details (remittance data)- The payment notification 108 may be carried out using a conventional facsimile machine 701 at the payee's location 700, or using Electronic Data Interchange (EDI).

The payee's bank 600 accepts the EFT money transfer 401 and credits the payee's account. The payee's bank 600 issues the usual bank account statement 601 to the payee, including the EFT money transfer 401 among other transactions. The bank account statement 601 is transmitted to the payee by mail or by other means.

In case of dispute between the service provider 100 and either the payer 200 or the payer's bank 500, the evidence disclosure 109 allows the service provider to prove to an arbitrator 800 that the payment was indeed requested by the payer 200 according to the prescribed procedures. The arbitrator 800 uses a combination of computer algorithms and expert testimony to make his ruling. The specialized encryption units 202 and 101 use public key cryptography to implement digital signatures. This allows the arbitrator 800 to validly testify to the authenticity of the business payment form 203 as it was transmitted.

The main advantage of the present invention is to avoid the high operating costs, delays, and payment risk associated with the traditional check payment. The invention allows smooth migration from paper based payment system to fully electronic payment by using Group 3 facsimile technology. At the payer site 200, paper based records are supported, but office automation can easily avoid paper records if the facsimile machine 201 is replaced by a personal computer fax modem. At the service provider site 100, no printed copy of the payment request is needed. The arbitrator 800 confirms the authenticity of a printed copy of the facsimile transmission without regard to its contents. The arbitrator 800 does not have to delve into transaction formats.

The use of a business form 203 offers an advantage for retail banking delivery. It allows the service provider 100 to launch new services with minimal system upgrade. If a new type of financial transaction initiation or request 106 is available to the service provider 100, it may be offered at the retail level to the payer 200 by designing a new business form 203, training operators working at the terminal 103 to process the new form, and allocating public network number 302 to the new service. The same advantage can be used to offer specialized financial transaction services. With the traditional view of retail banking delivery using EDI, the payer business system and the service provider system need to be upgraded prior to the introduction of a new transaction type.

The present invention is a payment process implemented by a service provider 100 and by payers 200 for payments initiated with a Group 3 facsimile transmission. To a lesser extent, the payer's bank 500, the payee 700, and the payee's bank 600 are participating in the process. This participation takes the form of prior agreements to process transactions initiated according to the details of the foregoing description. These transactions do not represent significant departure from the usual way of doing business for either the payer's bank 500, the payee 700, or the payee's bank 600.

If the present invention is used for payment of a monetery amount, the financial transaction ultimately involves the transfer of monetary value from the payer's bank to the payee's bank, with some related information. The EFT network 400 provides the payment ability, including the required settlement process between the two banks. Without departing from the spirit or essential characteristics of the present invention, it can be used for other types of financial value transactions.

The service provider 100 and the payer's bank 500 may be a unique organization or two distinct organizations. If they are distinct, the payer 200 mandates the service provider 100 as its representative for EFT transactions 106 initiated through the EFT network 400 and the payer's bank 500 agrees to authorize the final money transfer provided the payer 200 has sufficient funds in its account.

The payee's bank 600 must accept the money transfer 401 from the EFT network 400 on the payee's 700 account. The necessity and form of agreement from the payee's 700 part is irrelevant to the description of the present invention (it is sufficient to state that the payee's bank 600 must accept the money transfer 401). In any event, the identification of the payee's bank 600 and the payee 700 account number must be known by the service provider 100. This information may be part of the business form 203 contents.

The present invention uses specialized encryption units 202 and 101. They collectively perform the required communications security functions to prevent fraud and security breaches in the payment process. These functions include controlling access to the transaction ability of the encryption unit 202 (to protect the payer 200 against fraudulent payments on its account using the encryption unit 202). It also includes generating a cryptographic authentication code or digital signature for the business form 203 in its transmitted form (to protect the service provider against repudiation by the payer 200 of a legitimate payment after its occurrence).

The encryption unit 202 may be installed near the facsimile equipment 201 at the payer's location 200. It includes a magnetic card reader (or a hand-held memory receptacle), a keypad and a display for operator instructions and messages. The encryption unit 202 implements electronic access control mechanisms including the presentation of a magnetic card (or hand held memory device) and the entry of a PIN on the encryption unit 202 keypad. The encryption (decryption) unit 202 may be permanently connected to the facsimile machine 201 and to the transmission network access point 301. In this case, the access control procedure forces the individuals entitled to authorize payments to go to the encryption (decryption) unit 202. Alternatively, the encryption unit may be removable. In this latter case, it may be brought to the individuals entitled to authorize payments, which is more convenient for them. If the encryption (decryption) unit 202 is removable, it may be placed in a secure storage position when not in use, making the payment system more secure.

If the cryptographic keys used for signing are compromised because the encryption unit 202 is stolen along with a magnetic card (or hand held memory device) and the corresponding PIN, the encryption unit 202 has to be blacklisted within the service provider system 102. If there is a significant threat of cryptographic keys being compromised by undetected tampering with the encryption unit 202, electro-mechanical anti-tamper protection may be required in the encryption unit 202 design. Protection is required for the encryption unit 202 internal configuration, containing the cryptographic keys and access control data such as the PINs.

The encryption unit 101 is an attachment to a computer system implementing the corresponding cryptographic functions of the encryption unit 202. The encryption unit 101 sends the decrypted business form 203 in its transmitted form directly to the service provider system 102. The encryption unit 101 may be implemented either as a software component of the service provider system 102 or as a special purpose electronic system. In the latter case, the encryption unit 101 may be in an external enclosure or within the service provider system 102 itself as an optional printed circuit board.

The encryption (decryption) unit 202 has a bypass ability to allow the group 3 facsimile machine 201 to be used to send and receive normal facsimile messages. If the encryption (decryption) unit 202 is removable, the bypass mode is automatically enabled when it is removed. The encryption unit 101 does not need to have a bypass capability if direct access points to the transmission network 303 are available to the service provider system 102 for unsecured notifications by facsimile, electronic mail, EDI or otherwise.

Although public key cryptography supports both encryption and digital signatures, the present invention requires public key cryptography for digital signatures only. The encryption unit 202 affixes a digital signature to the business form 203 as transmission occurs, providing real-time authentication. The encryption unit 101 verifies the signature in real-time and lets the service provider system 102 record the business form 203 in its transmitted form along with the digital signature. This record is used to process the business form 203 contents and to verify the signature again if need be. The protocol between the encryption unit 200 and the encryption unit 101 must convey the payer 200 identification. No other details about the business 203 contents are required for the encryption unit 101.

The encryption unit 202 is capable of generating its own private/public key pair. The private part is never stored outside of the encryption unit 202 enclosure.

The payer 200 enters into a contractual arrangement with the service provider 100. The payer 200 agrees to be legally bound by transactions transmitted with the encryption unit 202. In terms of the prior art of public key cryptography, this means that a business form 203 in its transmitted form and digitally signed with the public key of the payer 200 is sufficient evidence for the payer consent to the business form 203 contents.

The authorized signatories for the payer's financial transactions must be registered in the encryption unit 202 internal configuration. This is equivalent to the registration of authorized signatories for a bank account and should be done with equivalent precautions. Each signatory receives a magnetic card (or hand held memory device) and a PIN. Each signatory name, its magnetic card number and its PIN are registered in the encryption unit 202 internal configuration. The authorized combinations of signatories must also be registered.

According to this authorization configuration, the encryption unit 202 controls the access to a private key usage. This private key is paired with the public key recognized by the payer 200 as its digital signature key for financial transactions. To secure the binding of payer 200 to its public key, it may be useful to seal a computer floppy disk containing the public key value plus a sample of the corresponding digital signature. The seal should be signed by the authorized signatories and safeguarded for dispute arbitration by the arbitrator 800. The service provider 100 must determine the public key of the payer 200 before the business form 203 in its transmitted form is processed. In the simplest case, the public key of the payer 200 is registered in the service provider system 102 when the encryption unit 202 authorization configuration is set up. The prior art of public key cryptography offers diverse mechanisms for situations where there are more than one service provider 100 and it is not economical for the payer 200 to register with all of them. In these cases, the ultimate responsibility for the integrity of the financial transaction process is not the service provider's 100 alone.

The service provider 100 is a participant in the EFT network 400. The service provider system 102 is authorized to initiate transactions in the EFT network 400 according to rules and agreements between the service provider 100 and the EFT network 400 administration. In the context of the present invention, the recording operation 107 of the transaction business form 203 would typically be a contractual obligation of the service provider 100 to use the EFT network 400. In addition, a copy of the resulting digital mass storage media 105 may be transmitted to the EFT network 400 administration on a periodic basis to protect other participants in the EFT network 400.

The financial position of the service provider 100 in the EFT network 400 is not relevant to the present invention description. In the case of money transfer 401 resulting from transaction 106, the financial position of the service provider is neutral if the digital mass storage media 105 is acceptable evidence of the payer 200 involvement.

The arbitrator's 800 role is to safeguard the acceptance of the financial transaction process by its participants. In terms of the prior art of public key cryptography, the arbitrator 800 arbitrates disputes over digital signatures by verifying the registration of the payer's 200 public key and the digital signature of a business form 203 in its transmitted form.

The present invention may be used with page image transmission techniques other than the Group 3 facsimile without departing from the spirit or essential characteristics thereof. It is sufficient for a transmission technique to allow the recipient to recover the page image of the business form 203 with a publicly specified process. It is sufficient for the arbitrator 800 to be able to recover the page image from the business form 203 in its transmitted form with this same process. In doing so, the arbitrator 800 need not rely on conventions established privately by the service provider 100, and need not rely on the content of the business form 203. The latter is irrelevant to the arbitrator's 800 role, which is limited to authenticating a digital signature of a page image.

System integrity requires the arbitrator's 800 role to be fully supported by the financial transaction system. If this condition is met, the circumstances requiring arbitrator 800 to intervene are unlikely to occur.

Although not strictly required, confidentiality protection may be offered by the encryption units 202 and 101. The use of a hashing algorithm in the form of a Manipulation Detection Code (MDC) prior to the digital signature algorithm is applicable to the present invention without altering the role of the digital signature.

Confidentiality protection may lessen the likelihood of signature forgery attacks to the payment system.

The payment process starts with the payer 200 out a business form 203 for a financial transaction request. The layout of the business form 203 can be specified by the service provider 100. These specifications may include fields filled out by the service provider (e.g. a form serial number), special markings for optical character recognition, or other techniques to facilitate automated transaction processing by the service provider 100. The present invention allows for the elimination of a handwritten signature on business form 203 since the encryption unit 202 provides secure authentication and access control. The elimination of a handwritten signature on the business form facilitates office automation at the payer 200 site where a personal computer equipped with a fax modem may replace the facsimile machine 201.

In the case of a simple payment transaction, the business form 203 contains typical payment information including the payer 200 identification, the payee 700 identification, the payer's bank 500, the payer's 200 account number, the payee's bank 600, the payee's 700 account number, and possibly remittance data (such as the list of invoices paid).

The prepared business form 203 is sent from the payer 200 site to the service provider 100 using the originating facsimile machine 201, the encryption unit 202, the payer access point to a transmission network 301, the transmission network 300, the service provider access point to the transmission network 302, the encryption unit 101, and finally the receiving service provider system 102. This transmission includes the results of the cryptographic process performed by the encryption unit 202.

The transmission network 300 may be the Public Switched Telephone Network (PSTN), or a digital network if the encryption unit 202 performs protocol along with encryption functions. The service provider 100 indicates to the payer 200 the transmission network addresses (telephone number in the case of the PSTN) to be used to reach the service provider access point to the transmission network 302. The transmission network provides the basic signaling, routing, and transmission facilities to the payer 200 at its access point 301 and to the service provider 100 at its access point 302. The diverse features of networking technology may be applicable to the present invention to improve its user-friendliness. For instance, signaling arrangements are possible at the service provider's access point to the transmission network 302 to facilitate call routing by the type of financial transaction request (with direct inward dialing, DID) and to ensure service availability (with call redirection).

The complete details of the operator interface at the originating facsimile machine 201 and the encryption unit 202 need not be specified for the description of the invention. There are logically two phases: the authorization, and the connection establishment with the service provider system 102. These two phases may be combined in a single operator procedure or preferably left separate since the authorization is a management task and connection establishment is a clerical task.

During the authorization phase, the signatories must present their magnetic card (or hand held memory device) to the encryption unit 202, enter their secret personal identification number (PIN), and enter the number of pages which they agree to sign. Since the encryption units 202 and 101 provide authentication without regard to the monetary value or other details of the financial transaction, the authorization to sign is given to the encryption unit 202 without a limit on the monetary value of the transactions (such a limit may be enforced by the service provider 100). The authorization to sign may be further restricted to a given transmission network number and a given time window. By restricting the authorization to a given transmission network number, a choice of service provider 100 to which the payment request may be presented is made.

During the authorization phase and according to the conventions established by the service provider 100, the signatories may be required to enter a message reference number (such as a check number or lot number) to be transmitted as the security label when payment form 203 is transmitted.

The connection phase consists of initiating a facsimile transmission from the facsimile machine 201 to the service provider system 102. The destination number dialing may be done using facsimile machine 201 or encryption unit 202. Speed dialers may be used to facilitate the operator's task. The connection phase is complete when the facsimile machine 201 starts the transmission of the first page of the business form 203. The connection phase includes a cryptographic authentication of encryption device 202 using procedures such as those set out in ISO/IEC 11577:1994. The connection phase includes the transmission of any message reference or security label entered during the authorization phase.

During the connection phase and the subsequent transmission of the business form 203, facsimile machine 201 operates like a normal group 3 facsimile machine.

During the transmission of business form 203, the encryption unit 202 calculates the digital signature of the transmitted pages using the private key of the payer 200 as previously authorized. At the end of transmission or at the end of each page in the transmission, the encryption unit 202 completes the digital signature transmission. The typical transmission report printed by group 3 facsimile equipment upon receipt of the final message confirmation (MCF) signal defined in CCITT recommendation T.30 is not an indication that the financial transaction request is accepted by the service provider 100.

Encryption unit 101 receives business form 203 in its transmitted form, any message reference or security label, and the digital signature generated by the encryption unit 202. If the facsimile transmission is of the Group 3 type, the business form 203 in its transmitted form complies with the coding specified in CCITT recommendations T4 and T6. The encryption unit 101 verifies the digital signature using the public key of the payer 200 to accept or reject the business form 203 contents as an authorized financial transaction request from the payer 200. Upon rejection, system integrity may require security investigation (the rejection may be caused by an attempt to fraudulently use the financial transaction system).

Upon acceptance of a complete message from payer 202, the service provider system 102 undertakes to process the business form 203 contents as a financial transaction request. This request may be internally queued until processing resources are available. The request may be processed by a human operator via the operator terminal 103 which displays the business form 203 contents and any received message reference or security label. If any message reference or security label is received, the operator may validate it against the contents of the displayed business form 203. Operator terminal 103 accepts manual data entry for the transaction details in a format suitable for later processing by the EFT network 400. The business form content 203 may be pre-processed by optical character recognition, or optical mark recognition as with existing imaging system for the banking industry. Once the transaction 106 is initiated in the EFT network 400, the recording 107 is completed, and the money transfer 401 is either committed or completed, the financial transaction is complete for the service provider 100.

The payee's bank 600 accepts the payment and credits the amount to the payee 700 account. The periodic bank account statement 601 is sent to the payee 700 in the course of normal banking operations. This statement 601 indicates the payment transaction as a credit to the payee 700 account from the EFT network 400, possibly with a reference number referring to the money transfer 401. The payer's bank 500 reports the debit transaction in the payer 200 account with the same process.

The payer 200 may need a confirmation of the financial transaction requests made with the present invention in addition to the payer's bank 500 periodic statement. This confirmation should include details on the transaction 106 unknown to the payer 200 such as the actual time of the transaction 106 or a reference number for the money transfer 401. The confirmation format and its transmission mechanism are irrelevant to the description of the present invention.

In the course of collection processing, the payee 700 normally requires a notification of the payment with remittance data to apply the money transfer 401 to the payer 200. It is then expected that either the payer 200 or the service provider 100 will notify the payee 700 with the relevant remittance data for the present invention to be useful. This notification may be made by facsimile, electronic mail, EDI or otherwise. The figure illustrates the payment notification 108 by the service provider 100 using the payee facsimile machine 701.

The electronic payment technologies in general reduce or eliminate the float created by the delays in the check collection process. This is beneficial to the banks and to the payees. For this reason, the payee 700 may encourage its debtors to use the present invention as payers 200. In addition, if the payee 700 would like to receive remittance information through EDI, it may encourage its debtors to use the present invention with a service provider 100 capable of EDI transactions. For these debtors, the present invention may be an economical alternative to EDI.

What is claimed is:

1. A method for transferring economic value from a payer to a payee comprising the steps of:

a) preparing a value transfer form including information for identifying a specific value to be transferred, a financial institution of the payee and an account number of the payee;

b) receiving and verifying a security code at an encryption unit to authorize a transmission including a cryptographic processing result;

c) preparing a facsimile transmission device to send an image of the value transfer form;

d) connecting the facsimile device through the encryption unit over a communication channel to a value transfer service provider;

e) sending said image of the value transfer form in said transmission;

f) receiving at the value transfer service provider said transmission including said cryptographic processing result;

g) sending a confirmation message to said facsimile device that said transmission has been correctly received;

h) decrypting the cryptographic processing result at the value transfer service provider;

i) determining whether the cryptographic processing result was authentically generated by the payer;

j) extracting said identifying information from the facsimile transmission; and k) generating an electronic value transfer transaction based on said identifying information provided that the cryptographic processing result is determined to be authentic in step (i).

2. The method as claimed in claim 1, wherein said cryptographic processing result includes a digital signature.

3. The method as claimed in claim 1, wherein said transmission includes encrypted data representing said image.

4. The method as claimed in claim 2, wherein step (b) comprises receiving and verifying both a first security code from a physical key read by a reader in said unit and a second PIN security code manually entered at a keypad of said unit.

5. The method as claimed in claim 1, further comprising a step of recording said transmission for future arbitration purposes.

6. The method as claimed in claim 2, further comprising a step of transmitting a confirmation message from the service provider to the payee, said message including details of said electronic value transfer transaction.

7. The method as claimed in claim 2, wherein said steps (b) and (d) comprise:
   taking said encryption unit from a secure storage position;
   receiving and verifying said security code at a position conveniently near where step (a) is carried out; and
   connecting said encryption unit to said channel and said facsimile device.

8. The method as claimed in claim 2, wherein steps a) to k) are preceeded by a preliminary contractual acceptance by the payer that said digital signature is always valid.

9. The method as claimed in claim 2, further comprising steps of:
   receiving at said encryption unit information for identifying said value transfer form;
   including in said transmission said form identifying information; and
   verifying at said service provider that said form identifying information corresponds with information obtained from said image.

10. The method as claimed in claim 9, wherein said form identifying information includes a number of value transfer forms to be transmitted in one facsimile transmission.

11. The method as claimed in claim 9, wherein said form identifying information includes a value transfer form serial number.

12. The method as claimed in claim 4, wherein steps a) to k) are preceeded by a preliminary contractual aceptance by the payer that said digital signature is always valid.

13. The method as claimed in claim 8, further comprising a step of receiving at said encryption unit a selection of one of a plurality of value transfer service providers, wherein said step (d) comprises connecting said facsimile device to said selected one of said plurality of value transfer service providers.

14. The method as claimed in claim 8, further comprising a step of recording said transmission.

15. The method as claimed in claim 12, further comprising a step of receiving at said encryption unit a selection of one of a plurality of value transfer service providers, wherein said step (d) comprises connecting said facsimile device to said selected one of said plurality of value transfer service providers.

16. The method as claimed in claim 12, further comprising a step of recording said transmission.

17. The method as claimed in claim 2, further comprising a step of receiving at said encryption unit a selection of one of a plurality of value transfer service providers, wherein said step (d) comprises connecting said facsimile device to said selected one of said plurality of value transfer service providers.

18. The method as claimed in claim 2, further comprising a step of recording said transmission.

19. The method as claimed in claim 2, wherein said transmission includes encrypted data representing said image.

20. The method as claimed in claim 3, further comprising a step of recording said transmission.

21. The method as claimed in claim 14, wherein said steps (b) and (d) comprise:
   taking said encryption unit from a secure storage position;
   receiving and verifying said security code at a position conveniently near where step (a) is carried out; and
   connecting said encryption unit to said channel and said facsimile device.

22. The method as claimed in claim 16, wherein said steps (b) and (d) comprise:
   taking said encryption unit from a secure storage position;
   receiving and verifying said security code at a position conveniently near where step (a) is carried out; and
   connecting said encryption unit to said channel and said facsimile device.

23. A method for transferring economic value from a payer to a payee by a value transfer service provider, comprising the steps of:
   a) receiving at the value transfer service provider a transmission including a cryptographic processing digital signature from a facsimile device of the payer, said transmission including image data of a value transfer form including information identifying a specific value to be transferred, a financial institution of the payee and an account number of the payee;
   b) sending a confirmation message to said facsimile device that said transmission has been correctly received;
   c) decrypting the cryptographic processing result at the value transfer service provider;
   d) determining whether the cryptographic processing result was authentically generated by the payer;
   e) extracting said identifying information from the facsimile transmission; and
   f) generating an electronic value transfer transaction based on said identifying information provided that the encryption is determined to be authentic in step (d).

* * * * *